Figure 1:
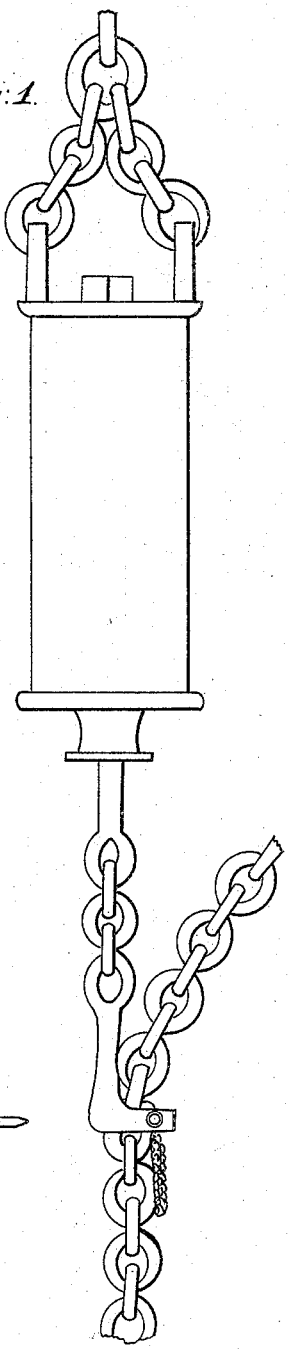

W. Wilcox.
Elastic Coupling.
N° 17,122.    Patented Apr. 21, 1857.

Section

UNITED STATES PATENT OFFICE.

WM. WILCOX, OF EAST HARTFORD, CONNECTICUT.

SURGE OR CABLE SPRING.

Specification of Letters Patent No. 17,122, dated April 21, 1857.

*To all whom it may concern:*

Be it known that I, WILLIAM WILCOX, of East Hartford, county of Hartford, State of Connecticut, have invented a certain Improvement in Surge or Cable Springs; and I do declare that the same as described and represented in the following specification and drawings is sufficient to enable others skilled in the art to make and use.

I will proceed to describe the construction and operation, referring to the drawings, in which the same letters indicate like parts in each of the figures.

The nature of my improvement consists in arranging in a cylinder india rubber disks and coiled springs with link eyes at one end with chain attached for the purpose of securing it to the capstan windlass or bits and having a shaft passing through the head in the opposite end and through the entire length of the cylinder. The cylinder will be air tight when the draft is upon it, and will admit air when the pressure is relaxed.

By my arrangement I produce decided advantage over others now in use, as it is more compact and powerful in its operation, excludes effectually dust and dirt, and is not liable to get out of order.

Figure 2:
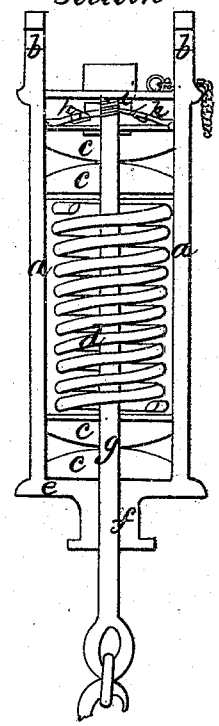
Figure 3:
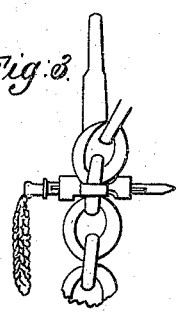

Figure 1 shows a perspective view of the arrangement. Fig. 2 shows a sectional view. Fig. 3 shows the grapple hook and pin for fastening the same.

In Fig. 2, $a$ is the cylinder, $b$ the link-eye by which it is secured to the capstan, $c$ are india rubber disks, $d$ are coiled springs, $e$ head to the cylinder, permanently secured, and against which the pressure comes, $f$ is a packing box made in the same manner in which all piston rods are packed, $g$ the piston rod passing through the india rubber and spiral springs and metallic plate $h$ and secured in its place by a nut or key, said metallic plate being provided with air valves in such a manner that when the spiral spring expands the air will be admitted into the chamber or center of the cylinder.

$i$ is a head secured in the end to prevent dirt accumulating inside of the cylinder.

Thus when the pressure or strain comes upon the chain, the resistance of the spiral spring will cause the rubber springs to expand and fill the cylinder and consequently compresses the air, which being elastic, relieves the sudden jerk upon the cable or vessel produced by a heavy sea.

It will readily be seen that by the use of this instrument the liability of the cable breaking or drag of anchor, is greatly removed, and the safety of the vessel increased, and admits of free and easy adjustment.

I am aware that surge spring relievers constructed of spiral springs of india rubber disks, and the pneumatic springs separately have been used.

What I claim therefore and desire to secure by Letters Patent is—

The arrangement of the springs $c$, and the springs $d$, within the cylinder operating as and for the purpose herein set forth.

WILLIAM WILCOX. [L. S.]

Witnesses:
T. J. GLOVER,
CHARLES H. SIMONTON.